(12) United States Patent
Oh

(10) Patent No.: US 6,257,731 B1
(45) Date of Patent: Jul. 10, 2001

(54) CONNECTIONS DEVICE OF ACTUATOR FOR SIDE MIRRORS OF AUTOMOBILE

(75) Inventor: Dae Yong Oh, Incheon-shi (KR)

(73) Assignee: Jaeil Engineering Co., Ltd., Icheon (KR)

( * ) Notice: Subject to any disclaimer, the term of this patent is extended or adjusted under 35 U.S.C. 154(b) by 0 days.

(21) Appl. No.: 09/641,439

(22) Filed: Aug. 17, 2000

(51) Int. Cl.[7] .................................................... G02B 7/182
(52) U.S. Cl. ........................... 359/872; 359/877; 248/479
(58) Field of Search .................................. 359/872, 877; 248/476, 479; 74/425, 606 R

(56) References Cited

U.S. PATENT DOCUMENTS

| | | | |
|---|---|---|---|
| 4,372,177 | 2/1983 | Yamana | 74/501 M |
| 4,815,837 | 3/1989 | Kikuchi et al. | |
| 5,369,530 | * 11/1994 | Yamauchi et al. | 359/874 |
| 5,900,999 | 5/1999 | Huizenga et al. | 359/877 |
| 5,986,364 | 11/1999 | Bingle et al. | 310/51 |
| 6,130,514 | * 10/2000 | Oesterholt et al. | 318/438 |

* cited by examiner

Primary Examiner—Cassandra Spyrou
Assistant Examiner—Mark A. Robinson
(74) Attorney, Agent, or Firm—Eric Bleich; Marguerite Del Valle

(57) ABSTRACT

The connections device of an actuator for side mirrors of an automobile, for a back observation, is constructed by forming its main body made of synthetic resin material to reduce weight of an actuator itself and curtail a manufacture cost, and by inserting metal support plates into both sides of the main body inside so as to support and rotate the gear in a part having a danger of a damage caused owing to rotating components such as a gear etc. to prevent the main body from being damaged, whereby resulting in a light weight of the actuator and lessening a manufacture cost through a use of the main body made of the synthetic resin material, and in lengthening a life of components together with a maintenance of a mechanical strength through a use of the support plates made of metal inserted into both sides of the main body inside.

1 Claim, 5 Drawing Sheets

CONNECTIONS DEVICE OF ACTUATOR FOR SIDE MIRRORS OF AUTOMOBILE

BACKGROUND OF THE INVENTION

1. Field of the Invention

The present invention relates to an actuator for side mirrors of an automobile, for an observation of the back, and more particularly, to a connections device of an actuator for side mirrors of an automobile, which has a light nature in weight and an elasticity on the basis of a synthetic resin formation thereof, to prevent an actuator from being damaged and transfer a rotation force of a driving motor without loss by employing a support plate for supporting an inside gear group.

2. Description of the Prior Art

An actuator for side mirrors of an automobile is used for motor bendable type side mirrors. In case a user tries to bend the side mirror of an automobile according to its necessity, the side mirror can be bent by rotating a main body of the side mirror through a use of a rotation force of a driving motor and a spline shaft so as to make the side mirror automatically bent, that is, by using power of an electric motor instead of a manual manipulation of a driver conventionally. Thus the user can make the side mirror bent in the inside of the automobile even without a drop of a window.

An actuator used in a conventionally motor bendable type side mirror includes a driving motor and numerous gear groups, a spline shaft, a worm and a worm wheel in the inside thereof, in other words, in general, not only such construction requires a maintenance of a mechanical strength, but also its main body is needed to be manufactured with matter such as metal based on a durable abrasion nature.

However, such metal main body is very difficult in its manufacture and its material expenses is comparatively high, which brings about a cause of increasing the cost of products. The weight of the actuator is also greatly heavy according to its material characteristic, thus a capacity of a motor for its driving must be increased and a damage or a breakdown upon several kinds of components such as gear, worm and worm wheel etc. is promoted due to the heavy weight.

Meantime, parts except the gear group rotated are not required in a mechanical strength or a durable abrasion nature, namely, a waste for resources not required is caused and its economic loss is also vast.

SUMMARY OF THE INVENTION

It is, therefore, a primary object of the present invention to provide a connections device of an actuator for side mirrors of an automobile, to reduce weight of an actuator itself and curtail a manufacture cost by providing a main body made of synthetic resin material, and not to damage the main body by inserting support plates made of metal into both sides of the main body inside so as to support and rotate the gear in a part having a danger of a damage caused owing to rotating components such as a gear etc.

Another object of the present invention is to provide a connections device of an actuator for side mirrors of an automobile, in which light weight of the actuator is obtained, a manufacture cost is reduced, a life of components is lengthened with a maintenance of a mechanical strength, by using a main body made of synthetic resin material and support plates made of metal inserted into both sides of the main body inside.

BRIEF DESCRIPTIONS OF THE DRAWINGS

The accompanying drawings, which are included to provide a further understanding of the invention and are incorporated in and constitute a part of this specification, illustrate embodiments of the invention and together with the description serve to explain the principles of the invention.

Figure 4:
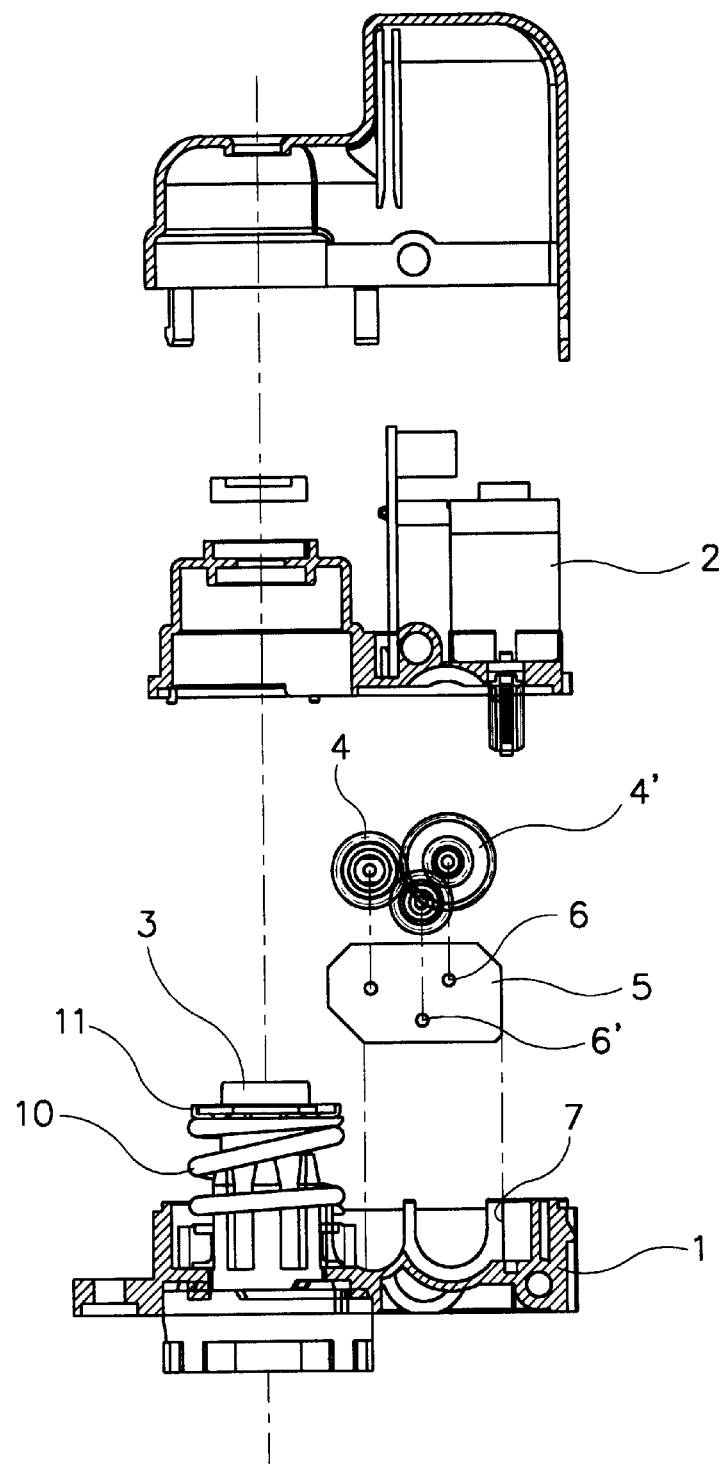

FIG. 4 sets forth an assembly state view of the inventive actuator; and

Figure 5:
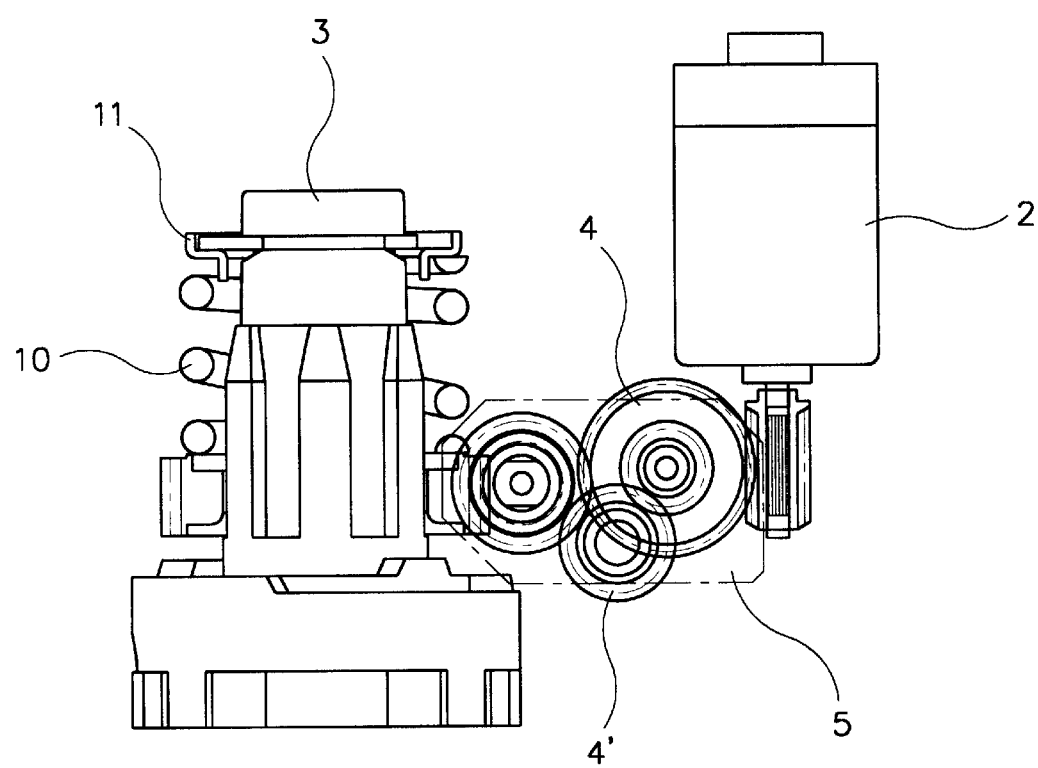

FIG. 5 represents an operational state view of the inventive actuator.

DETAILED DESCRIPTION OF PREFERRED EMBODIMENT

Reference will now be made in detail to the preferred embodiments of the present invention, examples of which are illustrated in the accompanying drawings.

Figure 1:
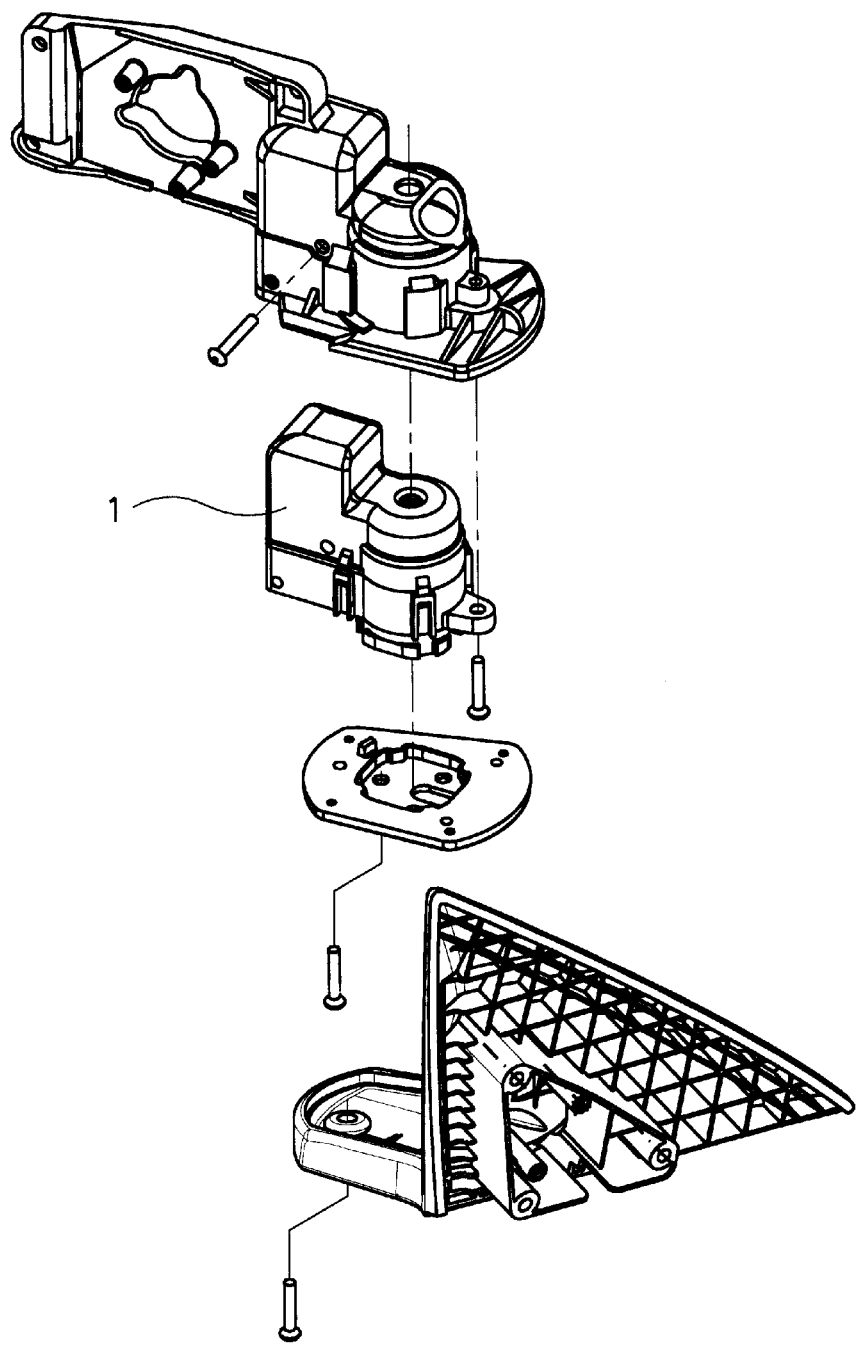
FIG. 1 shows an overall separated perspective view of a side mirror.
Figure 2:
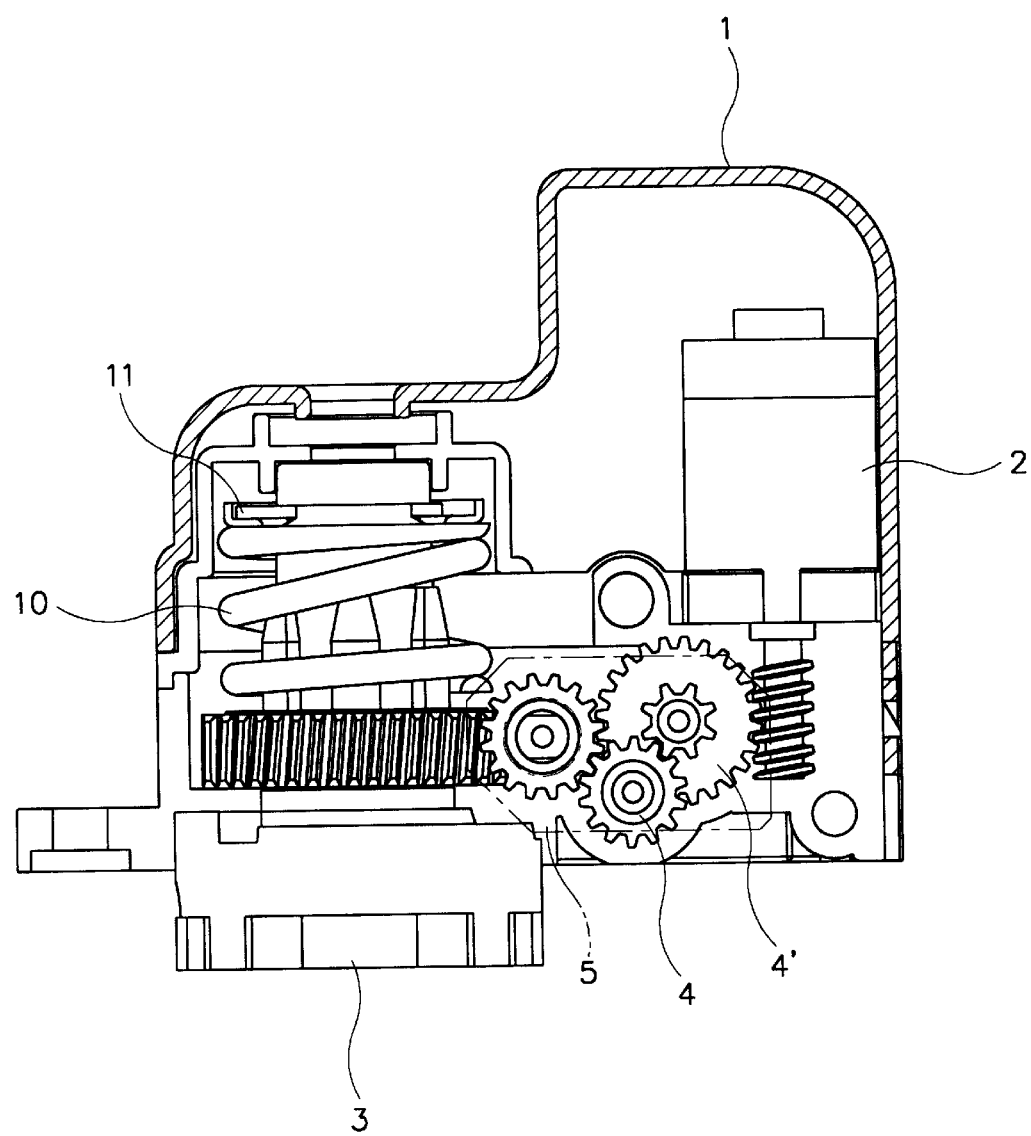
FIG. 2 depicts a sectional explanatory view of an actuator in accordance with the present invention.
Figure 3:
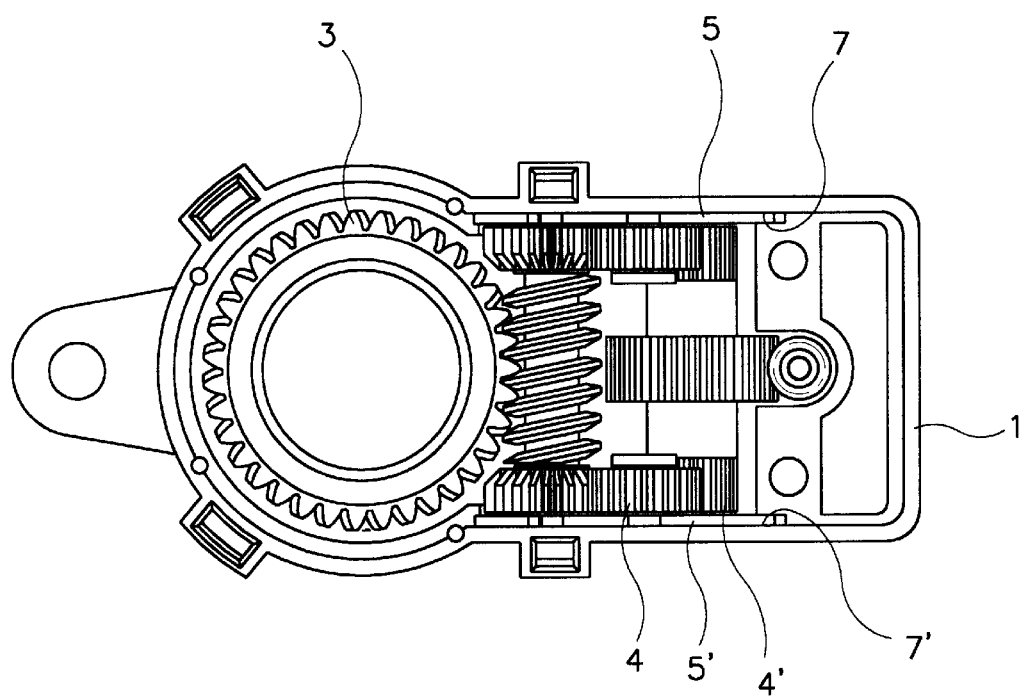
FIG. 3 illustrates a plane sectional explanatory view of the inventive actuator.

FIG. 1 represents an overall separated perspective view of a side mirror for an automobile employing an inventive actuator, FIG. 2 illustrates a side sectional view of the inventive actuator, and FIG. 3 shows its plane explanatory view.

In an actuator for a side mirror of an automobile, in which a driving motor 2 and a stationary shaft 3 fixed to an automobile body and connected through a plurality of gears 4,4' are provided in a main body 1 inside, and the main body 1 rotates by a constant angle centering on the stationary shaft 3 as an axle point; insertion flutes 7,7' are formed on both sides of the main body 1 inside, the main body 1 being made of synthetic resin material, and support plates 5,5' made of metal material are inserted into these insertion flutes 7,7', the support plates 5,5' having a plurality of insertion holes 6,6', and numerous gears 4,4' are tooth-combined and supported by both side support plates 5,5'.

Herewith, in the drawing a reference number 10 indicates a spring and 11 presents a washer, which are not explained in detail.

The inventive operations with such construction are described in detail with reference to the accompanied drawings.

FIG. 4 is a separate view showing parts in the inventive actuator inside, and FIG. 5 is a partially enlarged view showing a driving operation in the inside thereof.

The main body 1 inside space has an installment of the driving motor 2 formed on one side thereof, and on another side thereof the stationary shaft 3 is installed elastically by the spring 10 fixed by the washer 11.

The driving motor 2 and the stationary shaft 3 are connected with each other by numerous gears 4,4' through a tooth-combination so as to transfer a rotation power of the driving motor 2 to the stationary shaft.

Herewith, the insertion flutes 7,7' based on a long hole shape are formed on both side walls of the main body 1 inside having the gear, and the support plates 5,5' made of metal are inserted into the both side walls thereof in a mutually confronted shape, and a plural number of gears 4,4' are shaft-installed and combined therewith by a use of numerous insertion holes 6,6' formed on the support plates 5,5'.

In such construction, a rotation shaft of the gear does not have an occurrence of a contact with the main body 1 during a rotation of the gear 4,4', that is, it rotates only within the insertion holes 6,6' of the support plates 5,5', accordingly, there is no friction with the rotating body even though the main body 1 is formed as the synthetic resin material weak in a mechanical strength. Namely, a mechanical life is lengthened.

In addition, the insertion holes 6,6' formed on the support plates 5,5' not only have prominent precision and accuracy in comparison with insertion holes formed directly on a conventional metal main body, but also scarcely have abrasion, accordingly, there is no problems such as a change of a gear axial center and a transfer impossibility of a rotation force which may be caused due to a deformation of the insertion holes after a use for a long time thereof.

As afore-mentioned, in accordance with the present invention, in a connections device of an actuator for side mirrors of an automobile, a main body is formed with synthetic resin material to reduce weight of an actuator itself and curtail a manufacture cost, and in a part having a danger of a damage caused owing to rotating components such as a gear etc., support plates made of metal are inserted into both sides of the main body inside to make the gear supported and rotated thereby, whereby so as not to damage the main body.

Although the invention has been shown and described with respect to the preferred embodiments, it will be understood by those skilled in the art that various changes and modifications may be made without departing from the spirit and scope of the invention as defined in the following claims.

What is claimed is:

1. A connections device of an actuator for side mirrors of an automobile, in which a driving motor and a stationary shaft fixed to an automobile body and connected through a plurality of gears are set in a main body inside and the main body rotates by a constant angle centering on the stationary shaft as an axle point, said device characterized in that:

insertion flutes are formed on both sides of the main body inside, said main body being made of synthetic resin material; support plates made of metal material are inserted into the insertion flutes, said support plates having a plurality of insertion holes; and a plural number of gears are tooth-combined and supported by said support plates.

* * * * *